(No Model.) 2 Sheets—Sheet 1.
J. G. CHANCELLOR & E. C. HENRY.
HAND FIRE ENGINE.
No. 345,571. Patented July 13, 1886.
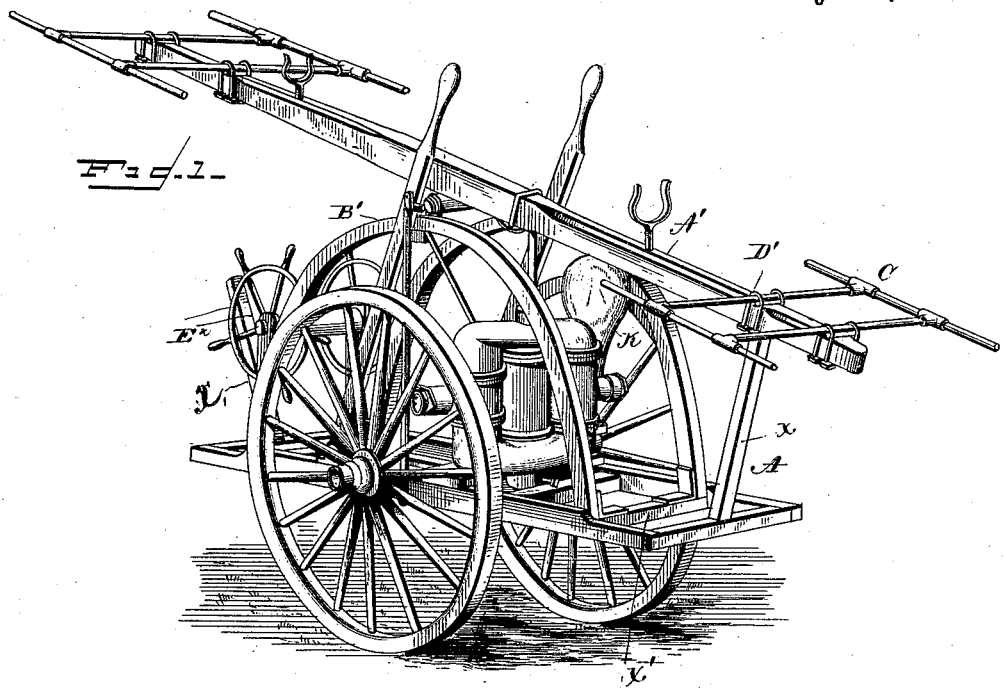
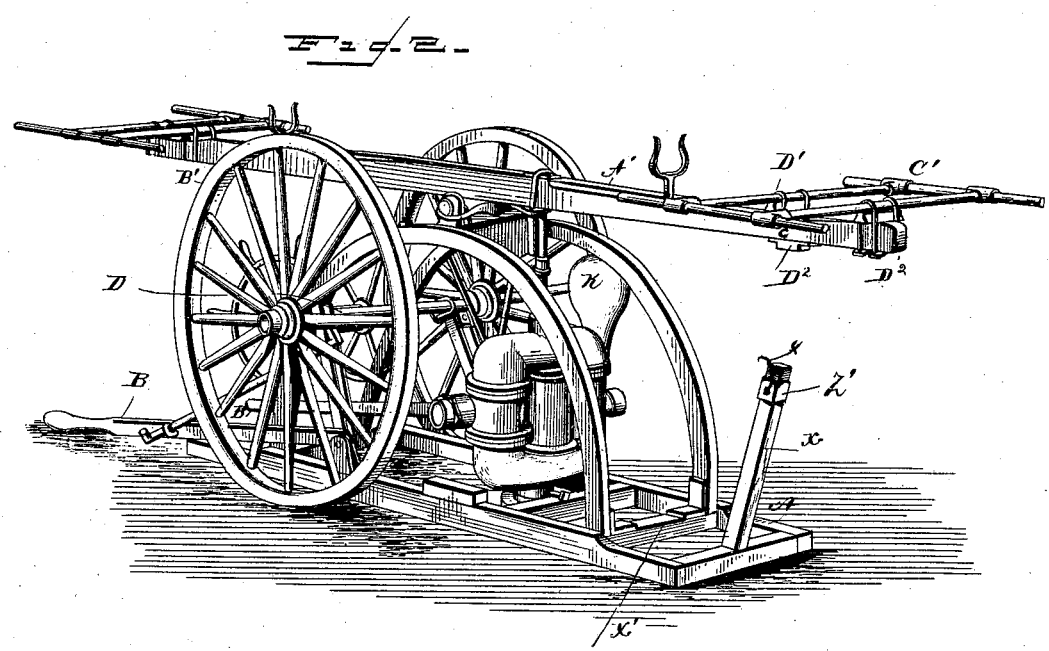
WITNESSES
F. L. Ourand
Frank A. Fouts
INVENTORS
Joshua G. Chancellor
Elias C. Henry
By Thomas Sladen Attorney (No Model.) 2 Sheets—Sheet 2.
J. G. CHANCELLOR & E. C. HENRY.
HAND FIRE ENGINE.
No. 345,571. Patented July 13, 1886.
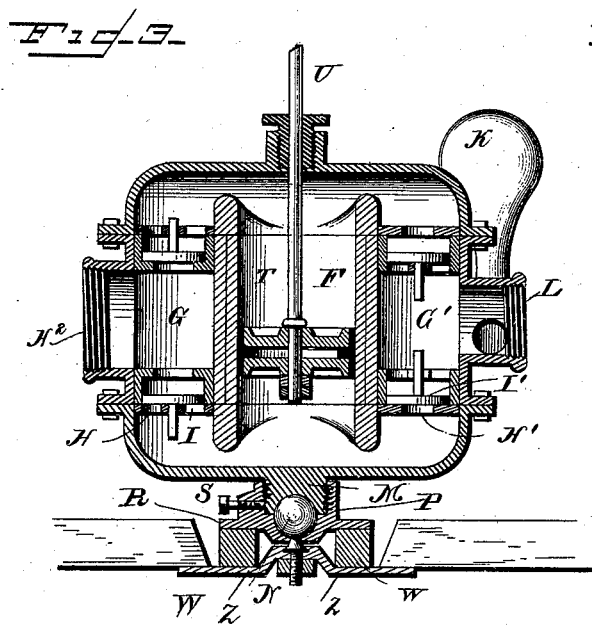
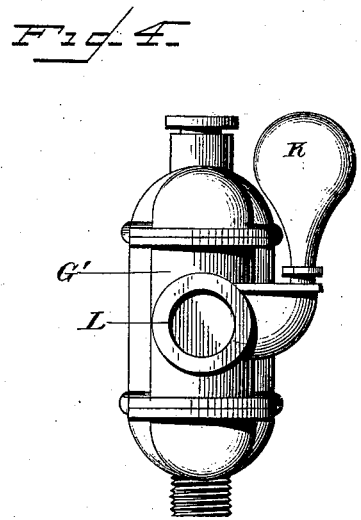
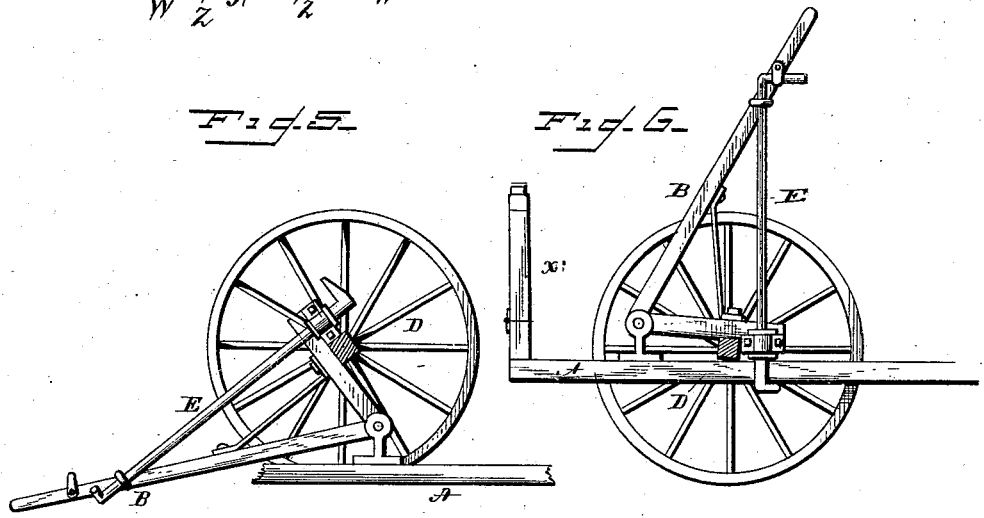
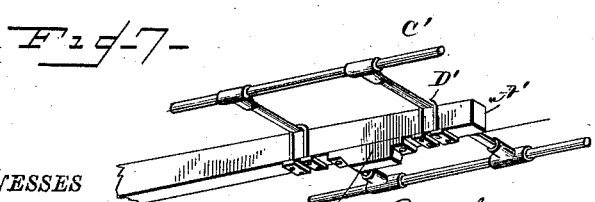
WITNESSES
F. L. Ouraud
Frank A. Fouts.
INVENTORS
Dr Joshua G. Chancellor
Elias C. Henry
By Thomas Slade Attorney
N. PETERS, Photo-Lithographer, Washington, D. C.

UNITED STATES PATENT OFFICE.

JOSHUA G. CHANCELLOR AND ELIAS C. HENRY, OF BLOOMINGTON, ILLINOIS; SAID CHANCELLOR ASSIGNOR TO SAID HENRY.

HAND FIRE-ENGINE.

SPECIFICATION forming part of Letters Patent No. 345,571, dated July 13, 1886.

Application filed July 17, 1885. Serial No. 171,906. (No model.)

*To all whom it may concern:*

Be it known that we, JOSHUA G. CHANCELLOR and ELIAS C. HENRY, citizens of the United States, both residing at Bloomington, in the county of McLean and State of Illinois, have jointly invented a new and useful Hand Fire-Engine, of which the following is a specification.

This invention relates to certain improvements in hand fire-engines; and it has for its objects to provide a compact and efficient double-acting pump and mechanism for operating the same, the whole being mounted upon a suitable frame or truck in such manner that it may be elevated between the wheels and accurately balanced, and lowered, when required, so as to rest upon the ground in such position as to move the induction and eduction pipes clear of the wheels, so as to give an unobstructed stretch to the hose, as more fully hereinafter specified. These objects we attain by the means illustrated in the accompanying drawings, in which—

Figure 1 represents a perspective view of our improved engine, showing the truck or frame in an elevated position. Fig. 2 represents a similar view, showing the truck or frame lowered. Fig. 3 represents a vertical sectional view of the double-acting pump; Fig. 4, a side elevation of the same; Fig. 5, a detached view showing the truck lowered and the elevating and lowering mechanism; Fig. 6, a similar view showing the truck elevated; and Fig. 7, a view showing the method of attaching the hand-rails to the oscillating pump-beam, and also showing a rubber cushion attached to said beam, to take up the shock when striking against the bumper.

The letter A indicates the truck or frame of the engine, which is hung to the angle-levers B, and secured to the axle D in such manner that when the long arms are depressed the frame will be lowered so as to rest upon the ground, as shown in Figs. 2 and 5, and when elevated the said truck or frame will be raised, as shown in Figs. 1 and 6. The truck may be held, when elevated, by any convenient latch mechanism.

The letter F indicates the pump cylinder, which is open at both ends and connects with the valve-chambers G and G', as shown in Fig. 3 of the drawings. These chambers are provided with valve-seats H H' and the puppet-valves I I'.

The chamber G has an induction-opening, $H^2$, to which the hose from a suitable water-supply may be attached, and the chamber G' is connected with the usual air-reservoir, K, and is provided with an eduction-opening, L, to connect with the delivery-hose.

The pump-cylinder is provided with a threaded projection, M, at its bottom, which sets over and works upon a ball, N, located in a similarly-socketed bearing, P, in a casting, R, which is threaded inside, the said projection being screwed into said threaded portion, and adjusted therein by means of a set-screw, S. The casting R rests upon a rubber ring, W, which serves as a balancing-spring to prevent friction of the piston-rod T, and allow the pump to be vibrated and freely revolved (even while in operation) to any desired position. The said ring rests upon the bottom plate, Z, to which the stem of the ball N is secured, the said plate being fastened to the frame of the engine.

The piston T is connected to the piston-rod of the engine in the usual manner. The latter at its upper end is pivoted to the oscillating beam A' of the engine. The said beam is fulcrumed between standards B' at each side of the truck, and is provided at each end with cross hand-rails C', which are secured to it by means of the clips D', as shown in detail in Fig. 7 of the drawings.

The shock occasioned by the beam striking against the forward bumper may be prevented by suitable cushions.

At one end of the truck of the engine is located a suitably-mounted reel, $E^2$, for the hose.

When the engine is to be transported, the truck is elevated, as shown in Fig. 1 of the drawings, and when it is to be put into operation it is lowered, as shown in Fig. 2, so as to rest upon the ground and clear the induction and eduction pipes from the wheels, as shown in Fig. 2, and thus permit an unobstructed stretch of the hose on each side.

The letters X X' indicate standard-bumpers located on the forward and rear ends of the frame A, and which are so constructed that the under side of the oscillating bar A' comes in contact with them when said beam is in action. The rear bumper is hinged to the frame A, as shown in Fig. 6, in any suitable manner, so that it can be lowered to clear the reel when winding or unwinding the hose. Either one of the bumpers can be locked to the beam A' by hooks x, located at the upper end of said bumpers, engaging eyes on the said beams, whereby the cross-pieces of the beam can be used in moving the machine.

We are aware that a hand fire engine has been constructed with a U-shaped axle operated by a lever for the purpose of raising or lowering the truck, and we do not claim such construction for doing the same thing.

Having thus described our invention, what we claim, and desire to secure by Letters Patent, is—

1. The combination, with the cylinder, of the threaded projection and the threaded socket, in which it is adjustably secured by means of a set-screw, the ball bearing located between the projection and socket, and the rubber ring and supporting-plate, the whole arranged to operate substantially in the manner specified.

2. The combination, with the frame A and straight axle D, of the angle-levers B, pivoted to the frame, and secured at their inner ends to the axle, whereby the frame may be raised or lowered by means of the pivoted portions of the levers, as shown and described.

3. The combination, with the frame A, having the oscillating beam A', of the bumpers X, located at the ends of the frame, one of which is hinged thereto, and the hooks x on the upper ends of said bumpers, all constructed and arranged to operate as shown and described.

JOSHUA G. CHANCELLOR.
ELIAS C. HENRY.

Witnesses:
W. E. GAPEN,
HENRY OTTO.